United States Patent
Johansson et al.

(10) Patent No.: US 6,752,576 B2
(45) Date of Patent: Jun. 22, 2004

(54) DISMOUNTABLE CLIP, AND A TOOL AND METHOD FOR PRODUCING THE CLIP

(75) Inventors: Peder Johansson, Gothenburg (SE); Kristian Ostergren, Alingsas (SE)

(73) Assignee: ITW Sverige AB, Molndal (SE)

( * ) Notice: Subject to any disclaimer, the term of this patent is extended or adjusted under 35 U.S.C. 154(b) by 0 days.

(21) Appl. No.: 10/236,048

(22) Filed: Sep. 6, 2002

(65) Prior Publication Data

US 2003/0053880 A1 Mar. 20, 2003

(30) Foreign Application Priority Data

Sep. 7, 2001 (SE) .............................................. 0102970

(51) Int. Cl.$^7$ ................................................ F16B 13/08
(52) U.S. Cl. ........................................ 411/21; 411/508
(58) Field of Search ........................... 411/21, 508, 509, 411/510, 913

(56) References Cited

U.S. PATENT DOCUMENTS

| | | | |
|---|---|---|---|
| 3,669,481 A | | 6/1972 | Bergmann |
| 3,905,270 A | * | 9/1975 | Hehl .......................... 411/509 |
| 4,122,583 A | * | 10/1978 | Grittner et al. ............. 411/510 |
| 4,633,640 A | | 1/1987 | Hutter |
| 4,693,389 A | | 9/1987 | Kalen |
| 4,762,437 A | * | 8/1988 | Mitomi ....................... 411/510 |
| 5,289,621 A | * | 3/1994 | Cerny et al. ................ 411/510 |
| 5,301,396 A | * | 4/1994 | Benoit ......................... 411/509 |
| 5,417,531 A | | 5/1995 | Brown |
| 5,718,549 A | | 2/1998 | Noda et al. |

FOREIGN PATENT DOCUMENTS

| | | |
|---|---|---|
| DE | 32 23 302 A1 | 12/1983 |
| EP | 0 888 927 A2 | 1/1999 |
| GB | 2305961 | 4/1997 |
| GB | 2340170 | 2/2000 |
| WO | WO 93/16291 | 8/1993 |
| WO | WO 99/08893 | 2/1999 |

* cited by examiner

Primary Examiner—Frederick L. Lagman
(74) Attorney, Agent, or Firm—Lowe Hauptman Gilman & Berner LLP

(57) ABSTRACT

A dismountable clip includes a stem part (11), an entry end (13), and a hole edge attachment end (12), intended for insertion into a hole. The stem part has protruding heel-like elements (14a, 15a) which can be pivoted in and back out elastically. In a recess (18) in the stem part, each heel-like element has a maneuvering shoulder (19, 20), at a distance inwards from a hinge (16, 17) connecting the heel-like element and the stem part. An axial hole (23) for receiving a dismounting tool is formed through the hole edge attachment end and the stem part to the maneuvering shoulders. A free space (22) is situated between the maneuvering shoulder and the entry end to allow the maneuvering shoulder and, hence, the heel-like element to be pivoted with the dismounting tool about the hinge in the direction towards the entry end.

18 Claims, 4 Drawing Sheets

DISMOUNTABLE CLIP, AND A TOOL AND METHOD FOR PRODUCING THE CLIP

TECHNICAL FIELD

The invention concerns fastening means of the type referred to in the field as clips. Such clips are used in holes of different types in a wide variety of construction elements. Clips are very common in the motor vehicle industry and are used, for example, to secure panels, but also various types of functional elements, for example cables, pipe conduits of various kinds, etc.

Clips also occur in various types of safety arrangements, for example for supporting vital parts in safety arrangements which deploy automatically in the event of collision, for example in airbags.

BACKGROUND ART

Clips of the type in question are input goods. Such goods have to be competitive in terms of price and satisfy stringent requirements in terms of uniform quality, and they must also meet stringent demands in respect of strength, stability and handling.

Clips made in one piece from plastic material or the like are very common. The material of the clip is chosen so that, in addition to the required mechanical stability/strength, the material also permits a certain degree of elastic resilience in areas of the clip where a kind of hinge or bridge is formed between material parts. A number of different types of clips made in one piece are already known in which heel-like elements interact with the stem of the clip via a hinge formed as a torsion hinge. These heels can be pivoted with elastic resilience into a recess in the clip stem. On assembly, the stem of the clip is quite simply pressed into a corresponding hole, the heels automatically swivel in and thereafter return to their original position, bearing against the underside of the object in which the hole is made.

Clips of said type are usually injection-moulded in multi-compartment tools or cast in a mould. The plastic material is preferably a thermoplastic, for example various types of acetal plastics, polypropylene, polyamide and the like are used. It is also possible to use thermosetting plastic.

SUMMARY OF INVENTION

The object of the invention is to further improve clips of said type by providing the possibility of optimum dismantling of the clip. This optimum dismantling entails that clips can be dismantled without any weakening whatsoever and can then be reinserted again into the same hole or some other corresponding hole.

For maintenance work and replacement of parts, for example in vehicles, clips are made available which permit non-destructive dismantling.

The novel clip construction makes it possible, as before, to produce the novel clip construction in the form of a clip made integral with a functional construction element. In accordance with an aspect of the present invention, a dismountable clip is provided. The clip includes a stem part, an entry end, and a hole edge attachment end, intended for insertion into a hole. The stem part has protruding heel-like elements which can be pivoted in and back out elastically. In a recess in the stem part, each heel-like element has a maneuvering shoulder at a distance inwards from a hinge connecting the heel-like element and the stem part. An axial hole for receiving a dismounting tool is formed through the hole edge attachment end and the stem part to the maneuvering shoulders. A free space is situated between the maneuvering shoulder and the entry end to allow the maneuvering shoulder and, hence, the heel-like element to be pivoted with the dismounting tool about the hinge in the direction towards the entry end.

In accordance with another aspect of the present invention, a method of producing a dismountable clip is provided. In accordance with the method, the clip is made in a divided mould tool, and the dividing plane of the mould tool is chosen such that it lies centrally in opposite sides of the stem part lacking heel-like elements. In addition, the axial hole extending to the maneuvering shoulder and the recess in the stem part are formed using the divided mould tool, using core pulling.

In accordance with a further aspect of the present invention, a method of dismounting a dismountable clip is provided. In accordance with the method, a rod-shaped dismounting tool is introduced into the axial hole in the stem part as far as the maneuvering shoulder. The end of the tool is engaged with the shoulder. The shoulder is pivoted towards the entry end, about the hinge, down into the free space between the maneuvering shoulder and the entry end. A gripable part of the hole edge attachment end or the stem part is thereafter gripped manually or with a tool, and the clip is removed without any interference from the heel-like elements.

DESCRIPTION OF AN EMBODIMENT OF THE INVENTION

Figure 1:
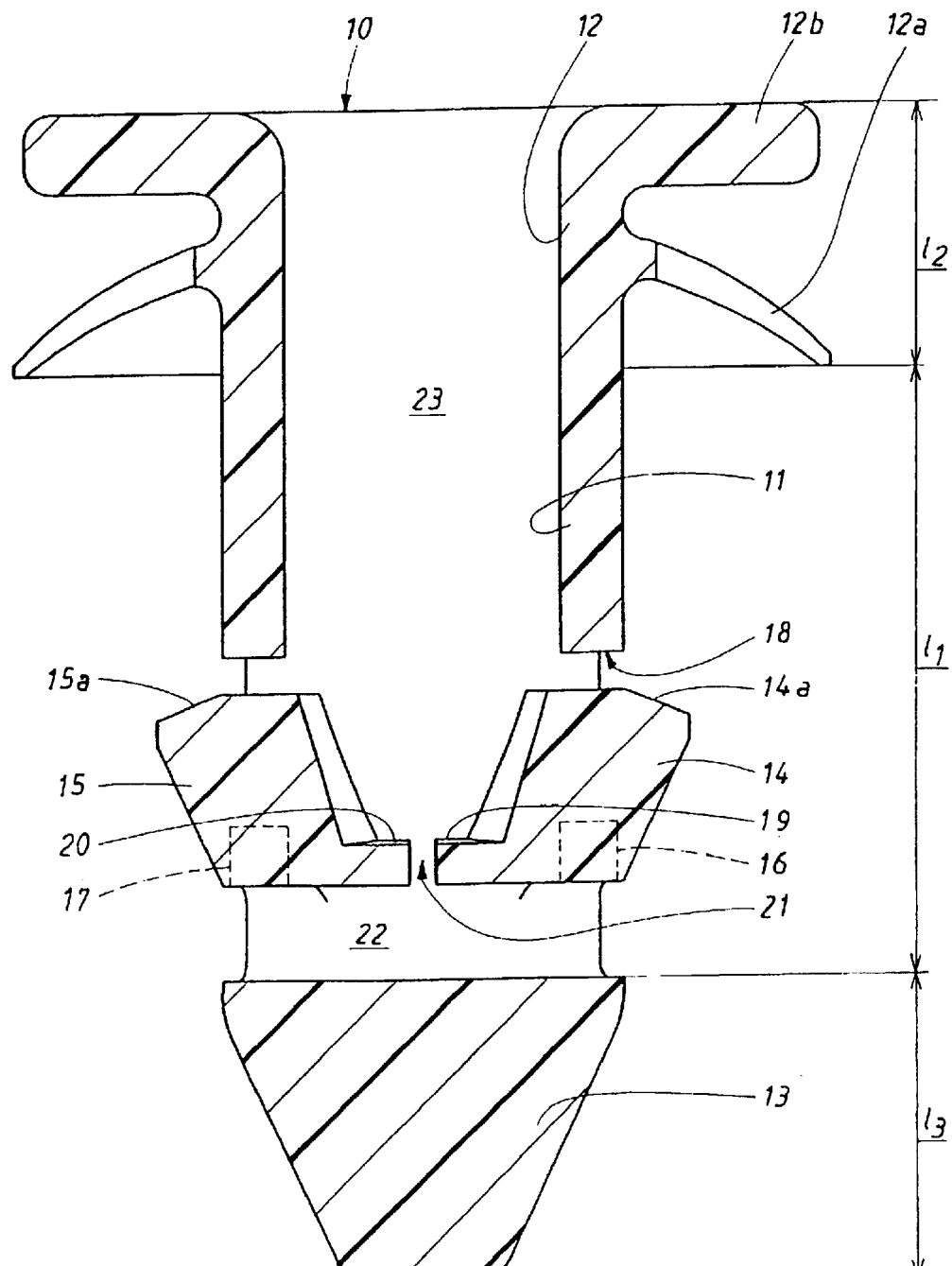
FIG. 1 is a central longitudinal cross section showing a clip in an embodiment of the invention.
Figure 2:
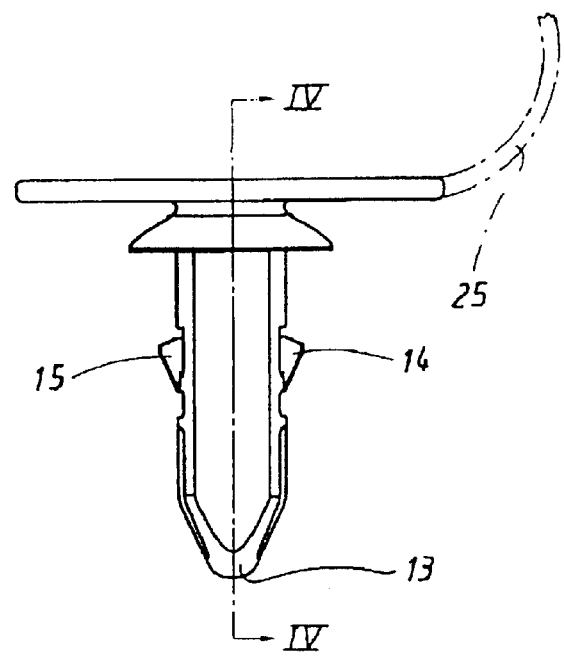
FIG. 2 shows the clip from FIG. 1, looking towards the broad side of its stem part.
Figure 4:
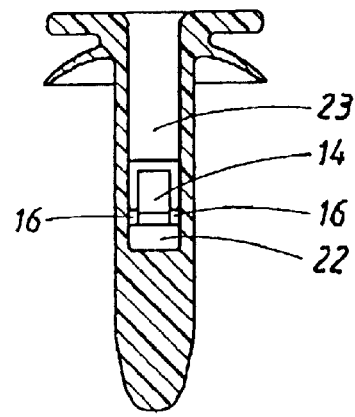
FIG. 4 shows a section along the line 4—4 in FIG. 2.
Figure 3:
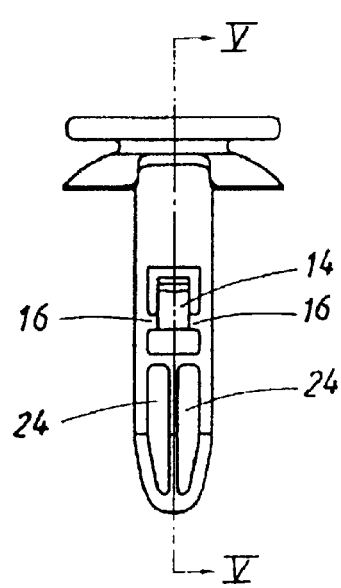
FIG. 3 shows the clip from FIG. 1, looking towards the narrow side of its stem part.
Figure 5:
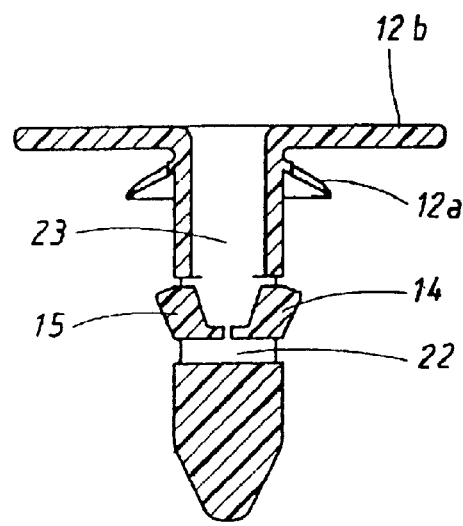
FIG. 5 shows a section along the line 5—5 in FIG. 3, FIGS. 6 to 8 show the principle by which the clip in the embodiment shown is fitted.

FIG. 1 shows an embodiment of a clip 10 according to the invention in longitudinal section in a plane containing its centre axis. In the embodiment shown, the stem part 11 of the clip has a substantially rectangular cross section with opposite pairs of substantially identical broad and narrow sides (see FIGS. 2 and 3). The longitudinal section through the narrow sides is shown in FIG. 1.

The clip 10 in FIG. 1 comprises, in addition to said stem part 11 of axial length $l_1$, a hole edge attachment end 12 which in the embodiment can be said in principle to have an axial length $l_2$, and an entry end 13 with axial length $l_3$.

A pair of elements 14, 15 intended for gripping the edge portion in a hole and for retaining the clip in the hole, and hereinafter referred to as heel-shaped elements, project from the narrow sides of the stem part 11. The heel-like elements lie in a diametrally continuous recess 18 which extends between the narrow sides of the stem part. In the embodiment shown, each of the heel-shaped elements 14, 15 is integral with the broad sides of the stem part via a pair of hinges, of the torsion hinge type, forming bridges 16 and 17.

On each heel-shaped element 14, 15 there is a manoeuvring shoulder 19, 20 and between these shoulders a gap 21 is left substantially centrally on both sides of the centre axis of the stem part 11.

Said transverse recess 18 in the stem part is designed in such a way that, below the two heel-like elements 14, 15, a free space 22 is formed between the underside of the manoeuvring shoulders 19, 20 and the entry end 13. This free space is dimensioned so that the heel-like elements 14, 15 can pivot about the hinges 16, 17 into the recess 18 until they lie substantially radially inside the outer surface of the narrow sides of the stem part 11.

In the clip 10 there is an axial hole 23 extending through the hole edge attachment end 12 and the stem part 11 to the recess 18. The hole 23 thus communicates with the manoeuvring shoulders 19, 20.

In the embodiment of the heel-like elements 14, 15 shown in FIG. 1, these have a substantially plane bearing surface 14a, 14b intended to engage against an edge portion of the underside of a hole in which the clip is intended to be inserted. To reduce the required clearance for pivoting the heel-like elements 14, 15 about the hinges 16, 17, the bearing surfaces 14a, 14b preferably form an angle of slightly greater than 90° to the centre axis of the stem part.

The arrangement comprising axial hole 23, manoeuvring shoulders 19, 20, hinges 16, 17 and free space 22 represents the basic requirement for obtaining effective insertion of the clip in a hole and non-destructive dismounting of the clip, for example for reusing it with the same mechanical properties retained.

In addition to the axial hole 23 representing an important element for the non-destructive dismounting (which will be discussed later in connection with FIGS. 9 to 12), it also contributes to the comparatively simple production of the clip in its entirety.

The entire structure—hole edge attachment end 12, stem part 11, heel-like elements 14, 15, hinges 16, 17 and entry end 13—can be produced in a divided mould tool with the dividing plane extending axially centrally through the narrow sides of the clip, with use of simple core pulling. It can be sufficient to pull the cores axially out from the hole edge attachment end 12 and at right angles to the narrow sides of the stem part and the entry end in the embodiment shown. An entry end 13 particularly well suited to the purpose can be made solid, and material-saving recesses can be made in the rest of the entry end and the stem part, using said simple core pulling.

Clips of the type in question, including clips in the embodiment shown, are suitably produced from injection-mouldable or castable material, especially acetal plastics, polypropylene, polyamide and the like, which, in addition to giving the desired mechanical strength, also have material properties which, as regards the hinges 16, 17, give elastic resilience, of the self-closing hinge type, and can thus form hinges operating according to the torsion principle.

FIG. 1 shows a hole edge attachment end 12 of a simple type. It has a circular sleeve-like collar 12a and a further collar 12b constituting the extreme end of the clip. By means of the shape that it has been given, the sleeve collar 12a has a certain return elasticity in the axial longitudinal direction of the clip. Between the bearing surfaces 14a, 14b of the heel-like elements and the sleeve collar 12a there is therefore an insert dimension with a certain tolerance, i.e. a clip with certain nominal dimension of the distance between the sleeve collar and the bearing surfaces can be used also for holes which deviate slightly from the nominal dimension. The term bearing, as it is used in the present context, does not of course need to mean that the stem part of the clip is completely fixed positionally in a hole, although such can be the case. A certain play or degree of freedom is possible if so required or if desirable.

The clip construction according to FIG. 1 is shown in greater detail in FIGS. 2 to 5. This shows, for example, recesses 24 in the entry end and the end of the stem part which save on material and which can be produced by said core pulling. The broken lines 25 indicate that the clip can be made integral with an element which has a specific function, for example a securing band for cabling or the like.

Figure 6:
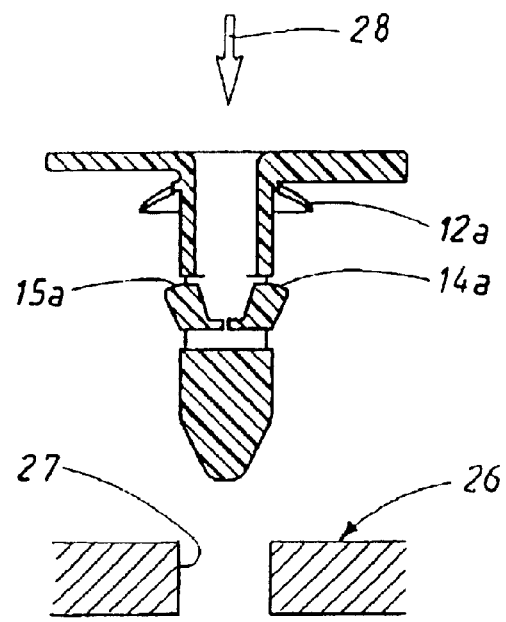
Figures 7, 8:
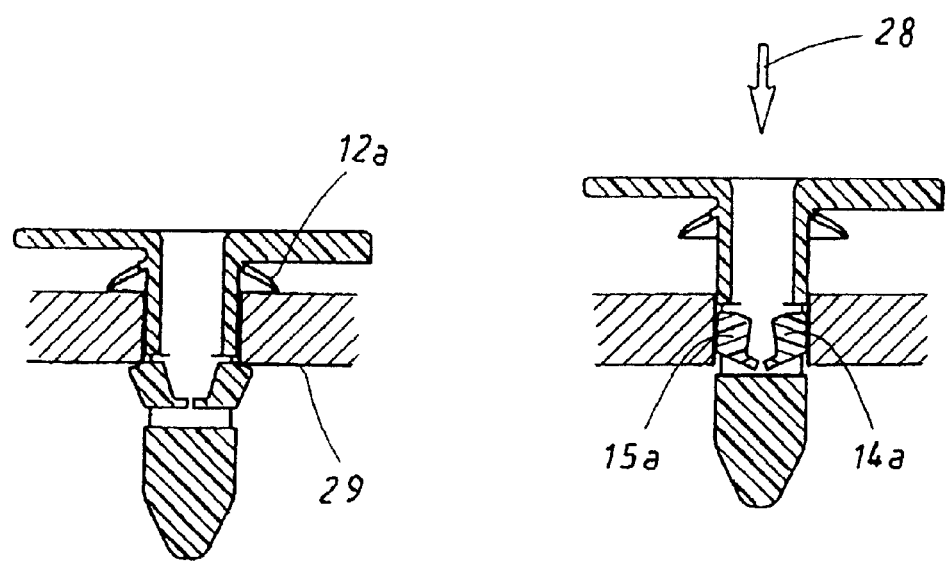
Figure 9:
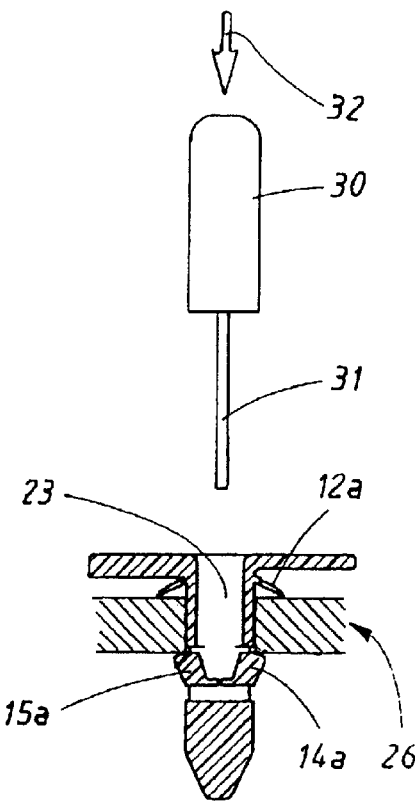
FIGS. 9 to 12 show how the clip is dismounted.

FIGS. 6 to 8 illustrate the procedure for fitting the described clip. The clip is inserted in the direction of the arrow 28 into a hole 27 in a construction element, for example a wall panel or other structural element of a motor vehicle or other object. Said nominal axial dimension between the sleeve collar 12a and the bearing surfaces 14a, 15a corresponds in principle to the thickness of the construction element 26, i.e. the axial length of the hole 27.

FIG. 7 shows the heel-like elements 14a, 15a pivoted into the radial recess 18 in the stem part 11, obtained through bearing against the boundary wall of the hole 27. This insertion of the clip into the hole is done, for example, manually or by machine.

In FIG. 8, the clip is in its final mounted position. In the example shown, the actual bearing is against the underside of the holed construction element 29, and the sleeve collar 12a also bears for its part against the top of the construction element.

FIGS. 9 to 12 show the non-destructive dismounting principle.

Figure 10:
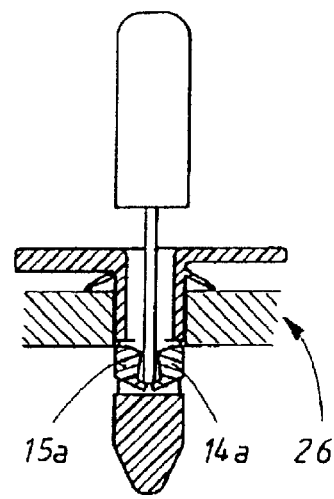
Figure 11:
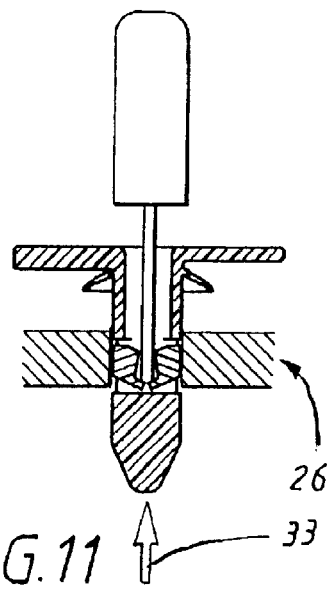

A tool 30 with a rod-shaped operative part 31 is introduced into the hole 23 in the direction of the arrow 32, either manually or by machine. In FIG. 10, the tool is at its bottom position. By bearing against the manoeuvring shoulders 19, 20, the element 31 has pivoted the heel-like elements 14, 15 into the recess 18 so that the heel-like elements lie inside or substantially in the plane of the outer narrow sides of the stem part 11.

Figure 12:
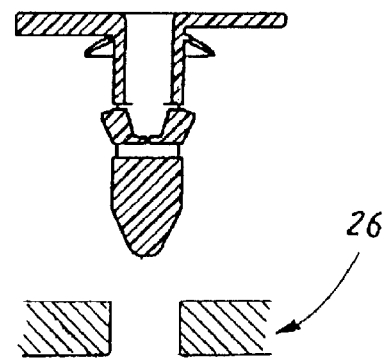

With the tool 30 in said position, a force is then applied in the direction of the arrow 33 (FIG. 11), manually or by machine, and the clip is pressed out of the hole 27 without destruction (FIG. 12).

In the embodiment of the clip shown, the clip stem has a substantially rectangular cross section. Other designs, for example circular or polygonal, are of course possible.

It is also possible to vary the number of so-called heel-like elements connected in an elastically pivotable manner to the stem part. In the embodiment shown, there are two such elements. In an embodiment with a stem part of circular cross section, there can for example be three or more "heel-like" elements.

It will thus be appreciated that the embodiment described and shown in the drawings constitutes just one example. Variations in design and dimensions and innumerable variants including clips integrated in different types of constructions are possible within the scope of the invention.

The invention is limited only by what is set out in the attached patent claims.

What is claimed is:

1. A clip (10) for insertion into a hole in an object, said clip comprising:
    a stem part (11), an entry end (13), and a hole edge attachment end (12) with means (12a) for bearing against an edge portion surrounding the hole (13); and
    arranged on the stem part (11), at least two heel-like elements (14, 15) which can pivot in elastically, and back again, extending outwards from the maximum external transverse dimension of the stem part to an external transverse dimension greater than the dimension of the hole, and which can bear against a side, facing away from said edge portion, of the object;

wherein each of said heel-like elements (14, 15) has a maneuvering shoulder (19, 20) situated in a recess (18) in the stem part, at a distance inwards from a hinge (16, 17) connecting the heel-like element and the stem part;

an axial hole (23) for receiving a dismounting tool (30) is formed extending through the hole edge attachment end (12) and the stem part (11) to said maneuvering shoulder (19, 20);

a free space (22) is situated between said maneuvering shoulder (19, 20) and the entry end (13) to allow the maneuvering shoulder and thus the heel-like element (14, 15) to be pivoted with said dismounting tool about said hinge (16, 17) in the direction towards the entry end; and said clip (10) is made in one piece from castable or injection-mouldable plastic material.

2. The clip according to claim 1, wherein the hole edge attachment end (12) and thus the clip (10) are made integral with a securing band for cabling.

3. The clip according to claim 1, wherein each heel-like element has, at the end directed towards the hole edge attachment end (12), a substantially plane bearing surface (14a, 14b) which forms an angle slightly greater than 90° to the centre axis of the stem part.

4. A method of producing the clip according to claim 2, wherein said clip (10) is made in a divided mould tool, and the dividing plane of the mould tool is chosen such that said dividing plane lies centrally in opposite sides of the stem part lacking said heel-like elements (14, 15).

5. The method according to claim 4, wherein said hole (23) extending to the maneuvering shoulder (19, 20) and said recess (18) in the stem part are formed using said divided mould tool, using core pulling.

6. A method of dismounting the clip according to claim 1, wherein a rod-shaped dismounting tool (31) is introduced into said axial hole (23) in the stem part (11) as far as the maneuvering shoulder (19, 20);

the end of the tool is engaged with the shoulder;

the shoulder is pivoted towards the entry end (13), about said hinge (16, 17), down into said free space (22) between the maneuvering shoulder and the entry end; and a gripable part of the hole edge attachment end or the stem part is thereafter gripped manually or with a tool, and the clip is removed without any interference from the heel-like elements.

7. A clip (10) for insertion into a hole in an object, said clip comprising:

a stem part (11), an entry end (13), and a hole edge attachment end (12) with means (12a) for bearing against an edge portion surrounding the hole (13); and arranged on the stem part (11), at least two heel-like elements (14, 15) which can pivot in elastically, and back again, extending outwards from the maximum external transverse dimension of the stem part to an external transverse dimension greater than the dimension of the hole, and which can bear against a side, facing away from said edge portion, of the object;

wherein each of said heel-like elements (14, 15) has a maneuvering shoulder (19, 20) situated in a recess (18) in the stem part, at a distance inwards from a hinge (16, 17) connecting the heel-like element and the stem part;

an axial hole (23) for receiving a dismounting tool (30) is formed extending through the hole edge attachment end (12) and the stem part (11) to said maneuvering shoulder (19, 20);

a free space (22) is situated between said maneuvering shoulder (19, 20) and the entry end (13) to allow the maneuvering shoulder and thus the heel-like element (14, 15) to be pivoted with said dismounting tool about said hinge (16, 17) in the direction towards the entry end;

said clip (10) is made in one piece from castable or injection-mouldable plastic material;

the hole edge attachment end (12) and thus the clip (10) are made integral with a securing band for cabling; and the maneuvering shoulder has a substantially plane surface (19, 20) oriented substantially at right angles to the axial extent of the stem part (11), and said plane surfaces of said heel-like elements extend substantially to the centre axis of the stem part, leaving a gap (21).

8. The clip according to claim 7, wherein said hinge (16, 17) is placed at the greatest possible distance from the centre axis of the stem part (11), with its radially outer boundary surface coinciding with the boundary surface of the stem part.

9. The clip according to claim 8, wherein the stem part has two opposite broad sides and two opposite narrow sides, said hinge (16, 17) extends between the broad sides and said at least two heel-like elements (14, 15) protrude from the narrow sides.

10. A clip for insertion into an opening in an object, said clip comprising:

a stem having an axial hole and a transverse recess; and at least two locking elements each being pivotally connected to said stem by a hinge and having a portion projecting outwards from an outer surface of said stem to bear against a side of the object when said slip is inserted into the opening;

wherein each of said locking elements is pivotable about said hinge to retract the respective portion within said recess formed in said stem;

each of said locking elements has a shoulder situated in said recess, inwardly of the respective hinge;

said axial hole for receiving a dismounting tool extends from a first end of said stem to communicate with said recess, the shoulders of said locking elements projecting into said axial hole when the respective portions of said locking elements project outwards from the outer surface of said stem;

a free space is provided between the shoulders of the locking elements and a second, opposite end of said stem to allow the shoulders and, hence, the respective locking elements to be pivoted with the dismounting tool about the respective hinges towards said second end; and said clip, including said stem, said locking elements and said hinges, is integrally made from a plastic material.

11. The clip according to claim 10, further comprising a collar at the first end of said stem, said collar being adapted to bear against an opposite side of the object, when said slip is inserted into the opening, and being molded integrally with said stem, said locking elements and said hinges to form a unitary body.

12. The clip according to claim 10, wherein the shoulder of each of said locking elements has a substantially plane surface oriented substantially at a right angle to an axial direction of said stem, the plane surfaces of the shoulders of said locking elements extending substantially to a central axis of said stem and being spaced from each other by a gap.

13. The clip according to claim 12, wherein each of said hinges is placed at the greatest possible distance from the central axis of said stem and has a radially outer boundary surface coinciding with the outer surface of said stem.

14. The clip according to claim 13, wherein said stem has a generally rectangular transverse cross section including two opposite broad sides and two opposite narrow sides, each of said hinges extending between the broad sides and the portions of said locking elements protruding from the narrow sides.

15. The clip according to claim 10, wherein the portion of each of said locking element has a substantially plane bearing surface which faces towards said first end of said stem and forms an angle slightly greater than 90° to a central axis of said stem, said bearing surface being adapted to bear against said side of the object when said slip is inserted into the opening.

16. A clip for insertion into an opening in an object, said clip comprising:

a stem having an axial hole and a transverse recess; and at least two locking elements each being pivotally connected to said stem by a hinge and having a portion projecting outwards from an outer surface of said stem to bear against a side of the object when said slip is inserted into the opening;

wherein each of said locking elements is pivotable about said hinge to retract the respective portion within said recess formed in said stem;

each of said locking elements has a shoulder situated in said recess, inwardly of the respective hinge;

said axial hole for receiving a dismounting tool extends from a first end of said stem to communicate with said recess, the shoulders of said locking elements projecting into said axial hole when the respective portions of said locking elements project outwards from the outer surface of said stem;

a free space is provided between the shoulders of the locking elements and a second, opposite end of said stem to allow the shoulders and, hence, the respective locking elements to be pivoted with the dismounting tool about the respective hinges towards said second end; and the shoulder of each of said locking elements has a substantially plane surface oriented substantially at a right angle to an axial direction of said stem, the plane surfaces of the shoulders of said locking elements extending substantially to a central axis of said stem and being spaced from each other by a gap.

17. The clip according to claim 16, wherein each of said hinges has a radially outer boundary surface coinciding with the outer surface of said stem.

18. The clip according to claim 16, wherein said stem has a generally rectangular transverse cross section including two opposite broad sides and two opposite narrow sides, each of said hinges extending between the broad sides and the portions of said locking elements protruding from the narrow sides.

* * * * *

UNITED STATES PATENT AND TRADEMARK OFFICE
CERTIFICATE OF CORRECTION

PATENT NO. : 6,752,576 B2
DATED : June 22, 2004
INVENTOR(S) : Peder Johansson et al.

It is certified that error appears in the above-identified patent and that said Letters Patent is hereby corrected as shown below:

Title page,
Item [75], Inventor, should read -- Peder Johansson, Goteborg, (SE) --.

Item [30], Foreign Application Priority Data should read -- 0102970-1 --.

Signed and Sealed this

Thirty-first Day of August, 2004

JON W. DUDAS
*Director of the United States Patent and Trademark Office*